United States Patent [19]

Efner et al.

[11] Patent Number: 5,565,517
[45] Date of Patent: Oct. 15, 1996

[54] SYNTHESIS OF ORGANIC POLYSULFIDE POLYMERS

[75] Inventors: Howard F. Efner; James E. Shaw, both of Bartlesville, Okla.

[73] Assignee: Phillips Petroleum Company, Bartlesville, Okla.

[21] Appl. No.: 340,576

[22] Filed: Nov. 16, 1994

[51] Int. Cl.$^6$ .................................................. C08K 5/16
[52] U.S. Cl. ...................... 524/714; 528/374; 528/375; 528/378; 528/379; 528/390; 524/722; 524/765; 524/767; 568/21; 568/23; 568/25; 568/26
[58] Field of Search ............................. 528/374, 375, 528/378, 379, 390; 524/714, 722, 765, 767; 568/21, 23, 25, 26

[56] References Cited

U.S. PATENT DOCUMENTS

| | | | |
|---|---|---|---|
| 2,024,567 | 12/1935 | Clifford | 548/158 |
| 2,897,140 | 7/1959 | Gislon et al. | 208/204 |
| 3,219,638 | 11/1965 | Warner | 528/375 |
| 3,247,089 | 4/1966 | Watson et al. | 208/198 |
| 3,277,180 | 10/1966 | Bapseres et al. | 568/26 |
| 3,308,166 | 3/1967 | Biensan et al. | 568/26 |
| 3,434,852 | 3/1969 | Louthan | 106/19 F |
| 3,452,100 | 6/1969 | Bennett et al. | 568/26 |
| 3,453,126 | 7/1969 | Greco et al. | 106/19 F |
| 3,734,753 | 5/1973 | Greco et al. | 106/19 F |
| 4,243,551 | 1/1981 | Ward | 252/428 |
| 4,868,336 | 9/1989 | Persnall | 568/25 |
| 4,937,385 | 6/1990 | Buchholz et al. | 568/26 |
| 5,001,269 | 3/1991 | Gongora et al. | 568/26 |
| 5,068,445 | 11/1991 | Arretz | 568/21 |
| 5,218,147 | 6/1993 | Shaw | 568/21 |
| 5,232,623 | 8/1993 | Shaw | 252/183.13 |
| 5,273,646 | 12/1993 | Frame et al. | 208/189 |
| 5,283,368 | 2/1994 | Shaw | 568/45 |

FOREIGN PATENT DOCUMENTS 51-31796   3/1976   Japan.

OTHER PUBLICATIONS

Kirk–Othmer Encyclop. Chem. Technol. 18:814–831 (1982).
Kirk–Othmer Encyclop. Chem. Technol., vol. 22, p. 953 (1982).
J. Org. Chem. 32:3833–3836 (1967).

*Primary Examiner*—Samuel A. Acquah
*Attorney, Agent, or Firm*—Lucas K. Shay

[57] ABSTRACT

A process for preparing an organic polysulfide polymer, such as polyethylene trisulfide, is provided which comprises contacting a dimercaptan such as 1,2-ethanedithiol with elemental sulfur using a basic catalyst wherein the dimercaptan, elemental sulfur, and basic catalyst are each present in an effective amount to effect the preparation of the organic polysulfide polymer. A process for controlling the molecular weight of an organic polysulfide polymer is also provided which comprises contacting a mercaptan with a dimercaptan and sulfur, in the presence of a basic catalyst, under conditions sufficient to prepare an organic polysulfide polymer.

39 Claims, No Drawings

SYNTHESIS OF ORGANIC POLYSULFIDE POLYMERS

FIELD OF THE INVENTION

The present invention relates to a process for synthesis of organic polysulfide polymers and a process for controlling the molecular weight of the organic polysulfide polymers.

BACKGROUND OF THE INVENTION

Organic polysulfide polymers are a class of important industrial compounds which have unusually good resistance to solvents and good low temperature properties. They can be used commercially, for example, in battery applications and in high pressure lubricant applications. Solid organic polysulfide polymers in the vulcanized cured state can be used in printing rolls, paint-spray hose, solvent hose, gaskets, and gas-meter diaphragms. Liquid organic polysulfide polymers are used mainly in sealants for double-pane insulating glass windows, building construction, boat hulls and decks, and printing rolls.

General procedure for the synthesis of organic polysulfide polymers involves in the reaction of dichloro aliphatic compounds with excess aqueous sodium polysulfide. For example, organic polysulfide polymers can be made from bis(2-chloroethyl) formal and sodium polysulfide. Bis(2-chloroethyl) formal is made from, and contaminated with, ethylene chlorohydrin, which is known to act as a chain terminator in the polysulfide polymerization thereby excessively limiting the molecular weight of the polymers.

Furthermore, because the reaction of dichloro aliphatic compounds and aqueous sodium polysulfide is exothermic, considerable cooling is required, thereby incurring high manufacturing costs. There is therefore an ever-increasing need to develop a better process for the preparation of organic polysulfide polymers. It would be a significant contribution to the art if a new, improved process for synthesizing organic polysulfide polymers were developed.

SUMMARY OF THE INVENTION

An object of the present invention is to provide a process for preparing an organic polysulfide polymer. Another object of the present invention is to provide a process for the oxidation of a dimercaptan using sulfur. A further object of the invention is to provide a process for controlling the molecular weight of an organic polysulfide polymer. An advantage of the present invention is that the present invention process is not exothermic. Another advantage is that the dimercaptan is oxidized by sulfur without introducing air or oxygen. Yet another advantage is that the by-product of the present invention is hydrogen sulfide which can be easily separated from the reaction mixture. Other objects, advantages, or features will become more apparent as the invention is more fully disclosed hereinbelow.

According to a first embodiment of the present invention, a process for the oxidation of a dimercaptan is provided which comprises contacting a dimercaptan, in the presence of a basic catalyst, with sulfur trader conditions sufficient to oxidize the dimercaptan wherein said dimercaptan, catalyst, and sulfur are each present in an effective amount to effect the oxidation.

According to a second embodiment of the present invention, a process which can be used to produce an organic polysulfide polymer is provided wherein the process comprises contacting a dimercaptan, in the presence of a basic catalyst, with elemental sulfur trader conditions effective to oxidize a dimercaptan to an organic polysulfide polymer wherein the dimercaptan, catalyst, and sulfur are each present in an effective amount to oxidize the dimercaptan to the organic polysulfide polymer.

According to a third embodiment of the present invention, a process, which can be used to control the molecular weight of an organic polysulfide polymer, is provided which comprises contacting a monomercaptan (hereinafter referred to as mercaptan) and a dimercaptan, in the presence of a basic catalyst, with elemental sulfur under conditions effective to oxidize a dimercaptan to an organic polysulfide polymer wherein the dimercaptan, catalyst, and sulfur are each present in an effective amount to oxidize the dimercaptan to the organic polysulfide polymer.

DETAILED DESCRIPTION OF THE INVENTION

According to the first embodiment of the invention, a process for oxidizing a dimercaptan is provided which comprises contacting a dimercaptan, in the presence of a basic catalyst, with elemental sulfur. Any dimercaptan that can be oxidized by elemental sulfur such as, for example, a primary or a secondary dimercaptan, can be used in the present invention. Examples of suitable dimercaptans include, but are not limited to, 1,2-ethanedithiol, 1,2-propanedithiol, 1,3-propanedithiol, 1, 10-decanedithiol, dipentene dimercaptan, ethylcyclohexyl dimercaptan, 1,4-benzenedithiol, 1,3-benzenedithiol, 1,2-benzenedithiol, and combinations of two or more thereof. The presently preferred dimercaptans are 1,2-ethanedithiol. 1,3-propanedithiol, and dipentene dimercaptan because the oxidation products thereof have important industrial applications.

The catalyst useful in the present invention can be any basic catalyst which is known in the art to catalyze the synthesis of an organic polysulfide. Generally, a base is preferred as a basic catalyst for use in the present invention.

The base useful as a component of the present invention is a basic compound that can effect the oxidation of a dimercaptan and can be an organic or an inorganic base, or combinations of any two or more thereof. Suitable bases include, but are not limited to methylamine, ethylamine, propylamine, isopropylamine, butylamine, isobutylamine, pentylamine, isoamylamine, dimethylamine, diethylamine, dipropylamine, dibutylamine, diisopropylamine, trimethylamine, triethylamine, tributylamine, ethylenediamine, sec-butylamine, tert-butylamine, methylethylamine, dimethyl-sec-butylamine, aniline, N-methylaniline, N,N-dimethylaniline, γ-aminobutyric acid, 2-aminoethanol, 2,4,6-tribromoaniline, N-methyl-N-ethylaniline, p-nitroso-N,N-dimethylamine, p-toluidine, cyclohexylamine, benzylamine, hexamethylenediamine, benzidine, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, potassium hydroxide, calcium hydroxide, magnesium hydroxide, sodium bicarbonate, sodium carbonate, sodium oxide, magnesium oxide, calcium oxide, calcium carbonate, sodium phenoxide, sodium bisulfide, sodium sulfide, barium phenoxide, calcium phenoxide, RONa, RSNa, and mixtures of any two or more thereof; where R can be a $C_1$–$C_{18}$ alkyl radical. Among the inorganic bases, sodium hydroxide is preferred, and among the organic bases, triethylamine is presently preferred because they are readily available and inexpensive.

The inorganic bases and tetraalkylammonium hydroxide useful as basic catalyst in the present invention can also comprise an alkoxylated compound selected from the group consisting of alkoxylated alcohols;, alkoxylated mercaptans, and combinations of any two or more thereof. The alkoxylated compound generally has about 3 to about 38 carbon atoms per molecule. The preparation of a composition comprising a base and an alkoxylated compound is disclosed in U.S. Pat. No. 5,283,368, disclosure of which is herein incorporated by reference. The presently preferred alkoxylated compound has the formula of $R"O(CH_2CH(R''')O)_pH$ wherein $R"$ is a $C_1-C_{20}$ hydrocarbyl radical, $R'''$ is hydrogen or a $C_1-C_{16}$ hydrocarbyl radical, and p is a number of from 1 to about 20.

The oxidation of dimercaptans by elemental sulfur to desired organic polysulfide polymers can be depicted as

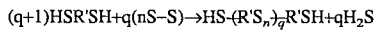

where $R'$ is a hydrocarbyl radical having 1 to about 20 carbon atoms and is selected from the group consisting of alkyl, aryl, cycloalkyl, alkylaryl, alkenyl radicals, and combinations thereof. Preferably $R'$ is an alkyl radical having 2 to 15 carbon atoms; n is a number between 2 to about 10, preferably 2 to 8; most preferably 2.5 to 5; and q is a number of 1 to about 1000. Preferably q is from about 5 to about 500, and most preferably from 10 to 200. The oxidation can be carried out in any suitable reaction vessel. The choice of reaction vessel is a matter of preference to those skilled in the art.

According to the first embodiment of the invention, suitable conditions for the contacting of dimercaptans with elemental sulfur are those conditions that can effectively oxidize the dimercaptans with the sulfur. Generally the conditions can include a temperature in the range of from about 20° C. to about 250° C., preferably from about 25° C. to about 200° C., and most preferably from 30° C. to 150° C. and a time of from about 1 minute to about 10 hours, preferably about 2 minutes to about 6 hours, and most preferably from 3 minutes to 3 hours. The pressure can vary widely from less than about 1 atmosphere to about 30 atmospheres, preferably from about 1 atmosphere to about 15 atmospheres, and most preferably from 1 atmosphere to 5 atmospheres.

Generally, one of the reactants, either dimercaptan or sulfur, can be slowly added to the other reactant in the presence of the catalyst described above. It is generally preferred that dimercaptan be added to sulfur. The sulfur, upon addition, readily dissolves in the solution. Mixing of the solution and/or operating at higher than ambient temperatures will enhance the reaction rate. The amount of sulfur added depends on the desired organic polysulfide polymer product. Generally, each mole of sulfur is contacted with or added to about 0.01 to about 2, preferably about 0.05 to about 1, and most preferably about 0.2 to about 0.8 moles of dimercaptan. The weight of the basic catalyst as a percentage of the weight of dimercaptan can be any percentage that is effective to oxidizing a dimercaptan and is generally in the range of from 0.001 to 50%, preferably about 0.01 to 10%, and most preferably 0.05 to 5%.

Following completion of the reaction, residual hydrogen sulfide can generally be removed from the organic polysulfide polymer product by either an inert gas purge or by vacuum stripping. When using an inert (or non-reactive) gas purge, the preferable gases are nitrogen and air. The organic polysulfide polymer can also be recovered by any means known to one skilled in the art such as, for example, filtration.

Following the removal of most of the residual hydrogen sulfide, the oxidized product can be further separated, purified, recovered, or combinations thereof, as necessary. This may be done by any conventional means; such as, for example, filtration or distillation.

According to the second embodiment of the present invention, a process for preparing an organic polysulfide polymer is provided. The process comprises contacting a dimercaptan having the formula of HSR'SH with elemental sulfur under conditions effective to achieve the synthesis of an organic polysulfide polymer. The invention process can be depicted as

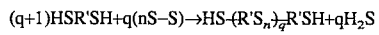

wherein the scope of n, q and $R'$ is the same as that disclosed in the first embodiment of the present invention.

The specific and illustrative conditions of the second embodiment of the invention are generally the same as disclosed above in the first embodiment of the invention. The organic polysulfide polymers can also be further separated, purified, recovered, or combinations thereof as disclosed in the first embodiment of the invention.

The oxidation of dimercaptans and the preparation of an organic polysulfide polymer can also be carded out in the presence of a solvent. The term "solvent" as used herein refers to a fluid possessing solvation properties and which may also partake in the reaction as part of a reaction intermediate. Suitable solvents include protic solvents such as water and alcohols and also aprotic solvents such as hydrocarbons and ethers. Specific examples of alcohols include, but are not limited to, methanol, ethanol, n-propanol, isopropanol, butanols, pentanols, and mixtures thereof. Specific examples of aprotic solvents include pentane, hexane, diethyl ether, tetrahydrofuran, and mixtures thereof. The most preferred solvent is methanol because of its availability and ease to use.

The weight ratio of solvent, if present, to the weight of the dimercaptan is to a great extent, dependent upon the available process equipment and within the discretion of one possessing ordinary skill in the art. Generally, it can be in the range of from about 100:1 to about 0.1:1, preferably from 10:1 to 1:1.

According to the third embodiment of the present invention, the molecular weight of the organic polysulfide polymers synthesized in the first or second embodiment of the invention can be controlled, or reduced, by a process which comprises contacting a mercaptan with a dimercaptan and elemental sulfur wherein the process is carried out in the presence of a basic catalyst.

Any mercaptan that can effect the change of the molecular weight of an organic polysulfide polymer synthesized according to the process disclosed in the second embodiment of the invention can be used. Generally, the mercaptan has the formula of R"SH wherein R" is a $C_1-C_{20}$ hydrocarbyl radical, or combinations of any two or more thereof. The hydrocarbyl radical is further selected from the group consisting of alkyl radicals, aryl radicals, cycloalkyl radicals, alkylaryl radicals, arylalkyl radicals, alkenyl radicals, and combination of any two or more thereof.

According to the third embodiment of the present invention, the organic polysulfide polymers have the formula of $GS_m(R'Sn)_qR'S_mG$ wherein $R'$ and n are the same as those described above; m=1 if G is hydrogen; and m is a number from 2 to about 10 if G is a $C_1-C_{20}$ hydrocarbyl radical.

Example of suitable mercaptans having the formula of R"SH include, but are not limited to, methyl mercaptan, ethyl mercaptan, n-propyl mercaptan, isopropyl mercaptan, n-butyl mercaptan, t-butyl mercaptan, n-hexyl mercaptan, cyclohexyl mercaptan, n-octyl mercaptan, nonyl mercaptan, t-nonyl mercaptan, n-decyl mercaptan, dodecyl mercaptan, t-dodecyl mercaptan, t-tetradecyl mercaptan, thiophenol, phenyl acetyl mercaptan, p-methyl phenyl mercaptan, benzyl mercaptan and combinations of any two or more, thereof. The presently preferred mercaptan is n-octyl mercaptan.

According to the third embodiment of the present invention, the definition, scope, and amount of dimercaptan, basic catalyst, and solvent are the same as those disclosed hereinabove. The conditions for controlling or reducing the molecular weight of an organic polysulfide polymer are the same as the conditions disclosed in the first or second embodiment of the present invention.

The amount of mercaptan required for controlling the molecular weight of an organic polysulfide polymer is an effective amount sufficient to effect altering the molecular weight of the organic polysulfide polymer. For example, as a percentage of the weight of the dimercaptan, the mercaptan can be present in the range of from about 0.001% to about 100%, preferably about 0.01.5% to about 50%, and most preferably 0. 1% to 25%, depending on the desired molecular weight of the organic polysulfide polymer.

The process of all three embodiments of the invention can also be carried out continuously. For example, the contacting of dimercaptans with elemental sulfur in the process of the above-disclosed composition can be done by employing continuous stirred tank reactors connected in series, packed columns or towers in which the invention catalyst is supported on a solid support, and other continuous flows that are readily within the realm of one skilled in the art.

The desired organic polysulfide polymer can be separated from the process mixture which contains unreacted mercaptan, unreacted dimercaptan, catalyst, and solvent, if present, by any conventional means such as, for example, filtration or distillation. The unreacted dimercaptan and catalyst can be recycled to produce additional organic polysulfide polymer.

The following examples are provided to further illustrate the practice of the invention and are not intended to limit the scope of the invention or the claims.

EXAMPLE I

This example illustrates the preparation of a polyethylene trisulfide having an average of 3 sulfurs per repeating unit by addition of dimercaptan to sulfur.

To a 500 ml, 3-necked flask equipped with a thermowell, magnetic stirring bar, pressure equalizing addition funnel, and condenser was added 16.0 g of sulfur (powdered flowers of sulfur), 70.0 g of methanol, and 0.4 ml of triethylamine. The mixture was heated to 45° C. and then 23.5 g of 1,2-ethanedithiol was added in portions over 10–15 min. Hydrogen sulfide was evolved during the addition. Polymer started to precipitate from the reaction mixture during the addition. The temperature was raised to 50° C. and maintained at 50° C. for 2 hours with stirring. The polymer was granular and could be stirred. The reaction mixture was cooled and then suction filtered in a Buchner funnel (water aspirator). The polymer was washed with 200 mls of methanol. The polymer was dried at room temperature using a stream of $N_2$ and later by standing in air at room temperature. The weight was 31.1 g ( 100% yield). The polymer was a light yellow granular solid (top 105°–112° C.) which analysis showed contained 19.1%C and 3.3%H (theoretical: C, 19.3%; H, 3.2%). Sulfur by difference was 77.6% (theoretical: 77.5%).

EXAMPLE II

This example illustrates the preparation of polyethylene trisulfide by addition of sulfur to dimercaptan.

To a 500 ml, 3-necked flask equipped with a thermowell, magnetic stirring bar, and condenser was added 23.5 g 1,2-ethanedithiol, 70.0 g methanol, and 0.4 ml of triethylamine. The solution was heated to 45° C. and then 16.0 g of sulfur (powdered flowers of sulfur) was added in portions over 10–15 minutes with stirring. Hydrogen sulfide was evolved during the addition. Polymer started to precipitate from the reaction mixture during the addition. The temperature was raised to 50° C. and maintained at 50° C. for 2 hours. Stirring was difficult since the polymer tended to stick together in large masses. The reaction mixture was cooled, suction filtered, washed with methanol, and dried the same way as described above in Example I. The weight was 31.4 g ( 101% yield). The polymer was a yellow solid (top 94°–102° C.) which analysis showed contained 19.5%C and 3.4%H (theoretical: 19.3% C; 3.2% H). Sulfur by difference was 77.1% (theoretical: 77.5%).

This example illustrating a procedure involving the addition of sulfur to dimercaptan produced a polymer which was somewhat more difficult to handle than the polymer from procedure illustrated in Example I where dimercaptan was added to sulfur. In the Example I procedure, the polymer produced was more granular and stirred and flowed more readily. In the Example II procedure, the polymer stuck together more and had a lower melting point. However, both procedures satisfactorily produced organic polysulfide polymers.

EXAMPLE III

This example illustrates the preparation of dipentene dimercaptan disulfide-trisulfide polymer. This example is also an inventive process for reducing the molecular weight of an organic polysulfide polymer.

Enough sulfur was used to make a polymer where the repeating unit contained about 2.5 sulfur on average per repeating unit and enough n-octyl mercaptan was added to lower molecular weight and cap end groups so the polymer would be more fluid.

To a 500 ml, 3-necked flask equipped with thermowell, magnetic stirring bar, and condenser was added 92.0 g of dipentene dimercaptan, 14.6 g of n-octyl mercaptan, and 1.0 ml of triethylamine. The solution was heated to 60° C. and then 24.0 g of sulfur (powdered flowers of sulfur) was added in portions over 15–20 minutes. Hydrogen sulfide was evolved. The reaction mixture was heated an additional 1.5 hours at 60° C. with stirring and then sparged with $N_2$ for 3 hours at 60° C. condenser removed during sparging). After cooling, the polymer product was a light yellow, viscous liquid ( 114 g, 100% yield). The polymer flowed much more readily if heated. Analysis showed the polymer contained 55.9% C and 8.9% H. Sulfur by difference was 35.2%. Theoretical values for C, H, and S are 56.1, 9.5, and 34.4%, respectively.

EXAMPLE IV

This is a comparative example demonstrating the preparation of trisulfide polymer from dipentene dimercaptan having an average of 3 sulfur per repeating units wherein no mercaptan was used to control the molecular weight.

To a 500 ml flask equipped with thermowell, magnetic stirring bar, and condenser was added 102 g of dipentene dimercaptan and 1.5 mls of triethylamine. The mixture was heated to 60° C. and 32 g of sulfur (powdered flowers of sulfur) was added in portions over 15–20 minutes. Hydrogen sulfide was evolved. The reaction mixture was then heated for 1.5 hours at 60° C. with stirring and then sparged with $N_2$ (very slowly) for 3 hours at 60° C. (condenser removed during sparging). After cooling the orange polymer product was essentially solid. It was thermoplastic and flowed slowly at 60° C. The yield was 118 g (100%).

Another run was done using the same procedure described immediately above except that the amount of sulfur was 24 g. The polymer produced was very viscous (almost soft solid) and did not really flow at room temperature (about 25° C.). It had to be heated in order to flow somewhat. The polymer from this run and the one immediately above were somewhat solid-like at room temperature while the product produced in Example III was a liquid and flowed freely at room temperature.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process for producing an organic polysulfide polymer comprising contacting a dimercaptan with elemental sulfur in the presence of a basic catalyst and an alkoxylated compound under conditions sufficient to synthesize an organic polysulfide wherein said dimercaptan, said basic catalyst, and elemental sulfur are each present in an effective amount to effect the production of an organic polysulfide polymer; and said alkoxylated compound is selected from the group consisting of alkoxylated alcohols, alkoxylated mercaptans and combinations of any two or more thereof.

2. A process according to claim 1 wherein said organic polysulfide polymer has a formula of $HS\text{-}(R'S_n)_q R'SH$ wherein R' is a hydrocarbyl radical having 1 to about 20 carbon atoms, n is a number between 2 to about 10, and q is a number of 1 to about 1,000.

3. A process according to claim 2 wherein R' is a hydrocarbyl radical having 2 to 15 carbon atoms and q is a number of about 5 to about 500.

4. A process according to claim 1 wherein said dimercaptan is selected from the group consisting of 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,2-benzenedithiol, 1,3-benzenedithiol, and combinations of any two or more thereof.

5. A process according to claim 1 wherein said dimercaptan is 1,2-ethanedithiol.

6. A process according to claim 1 wherein said basic catalyst is selected from the group consisting of methylamine, ethylamine, propylamine, isopropylamine, butylamine, isobutylamine, pentylamine, isoamylamine, dimethylamine, diethylamine, dipropylamine, dibutylamine, diisopropylamine, trimethylamine, triethylamine, tributylamine, ethylenediamine, sec-butylamine, tert-butylamine, methylethylamine, dimethyl-sec-butylamine, aniline, N-methylaniline, N,N-dimethylaniline, γ-aminobutyric acid, 2-aminoethanol, 2,4,6-tribromoaniline, N-methyl-N-ethylaniline, p-nitroso-N,N-dimethylamine, p-toluidine, cyclohexylamine, benzylamine, hexamethylenediamine, benzidine, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, potassium hydroxide, calcium hydroxide, magnesium hydroxide, sodium bicarbonate, sodium carbonate, sodium oxide, magnesium oxide, calcium oxide, calcium carbonate, potassium carbonate, sodium phenoxide, sodium bisulfide, sodium sulfide, barium phenoxide, calcium phenoxide, RONa, RSNa, and combinations of any two or more thereof wherein R is a $C_1$–$C_{18}$ alkyl radical.

7. A process according to claim 1 wherein said basic catalyst is sodium hydroxide.

8. A process according to claim 1 wherein said alkoxylated compound is an ethoxylated alcohol having the formula of $R''O(CH_2CH(R''')O)_pH$ wherein R'' is a $C_1$–$C_{20}$ hydrocarbyl radical; R''' is selected from the group consisting of hydrogen, $C_1$–$C_{16}$ hydrocarbyl radicals, and combinations of any two or more thereof; and p is a number of 1 to about 20.

9. A process according to claim 1 wherein said basic catalyst is triethylamine.

10. A process according to claim 1 wherein said organic polysulfide polymer is polyethylene polysulfide having the formula of $HS\text{-}(CH_2\text{---}CH_2\text{---}S_n)_q CH_2CH_2SH$ wherein q is a number from 10 to 200.

11. A process according to claim 1 wherein said process is carried out in the presence of a solvent.

12. A process according to claim 11 wherein said solvent is selected from the group consisting of water, alcohols, hydrocarbons, ethers, and mixtures thereof.

13. A process according to claim 11 wherein said solvent is methanol.

14. A process according to claim 1 wherein the molar ratio of dimercaptan to sulfur is in the range of from about 0.01:1 to about 2:1.

15. A process according to claim 1 wherein the molar ratio of dimercaptan to sulfur is in the range of from 0.2:1 to 0.8:1.

16. A process according to claim 1 wherein unreacted dimercaptan is separated from said organic polysulfide polymer for reuse as reactant.

17. A process according to claim 1 wherein said dimercaptan is selected from the group consisting of 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,2-benzenedithiol, 1,3-benzenedithiol, and combinations of any two or more thereof; said basic catalyst is selected from the group consisting of methylamine, ethylamine, propylamine, isopropylamine, butylamine, isobutylamine, pentylamine, isoamylamine, dimethylamine, diethylamine, dipropylamine, dibutylamine, diisopropylamine, trimethylamine, triethylamine, tributylamine, ethylenediamine, sec-butylamine, tert-butylamine, methylethylamine, dimethyl-sec-butylamine, aniline, N-methylaniline, N,N-dimethylaniline, γ-aminobutyric acid, 2-aminoethanol, 2,4,6-tribromoaniline, N-methyl-N-ethylaniline, p-nitroso-N,N-dimethylamine, p-toluidine, cyclohexylamine, benzylamine, hexamethylenediamine, benzidine, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, potassium hydroxide, calcium hydroxide, magnesium hydroxide, sodium bicarbonate, sodium carbonate, sodium oxide, magnesium oxide, calcium oxide, calcium carbonate, potassium carbonate, sodium phenoxide, sodium bisulfide, sodium sulfide, barium phenoxide, calcium phenoxide, RONa, RSNa, and combinations of any two or more thereof; R is a $C_1$–$C_{18}$ alkyl radical; the molar ratio of said dimercaptan to elemental sulfur is in the range of from about 0.01:1 to about 2; and said process is carried out at a temperature in the range of from about 25° C. to about 200° C. for about 2 minutes to about 6 hours.

18. A process for producing polyethylene polysulfide comprising contacting 1,2-ethanedithiol with elemental sulfur in the presence of triethylamine at a temperature in the range of from 50° C. to 150° C. for 1 minute to 5 hours.

19. A process comprising contacting a mercaptan with a mixture which comprises a dimercaptan, elemental sulfur, a basic catalyst, and an alkoxylated compound under conditions sufficient to synthesize an organic polysulfide wherein said mercaptan, said dimercaptan, elemental sulfur, and said basic catalyst are each present in an amount effective to effect the preparation of an organic polysulfide polymer; and said alkoxylated compound is selected from the group consisting of alkoxylated alcohols, alkoxylated mercaptans and combinations of any two or more thereof.

20. A process according to claim 19 wherein said mercaptan has the formula of R"SH wherein R" is selected from the group consisting of $C_1$–$C_{20}$ hydrocarbyl radicals, and combinations of two or more thereof.

21. A process according to claim 19 wherein said mercaptan is selected from the group consisting of methyl mercaptan, ethyl mercaptan, n-propyl mercaptan, isopropyl mercaptan, n-butyl mercaptan, t-butyl mercaptan, n-hexyl mercaptan, cyclohexyl mercaptan, n-octyl mercaptan, nonyl mercaptan, t-nonyl mercaptan, n-decyl mercaptan, dodecyl mercaptan, t-dodecyl mercaptan, t-tetradecyl mercaptan, thiophenol, phenyl acetyl mercaptan, p-methyl phenyl mercaptan, benzyl mercaptan, and combinations of any two or more thereof.

22. A process according to claim 19 wherein said mercaptan is n-octyl mercaptan.

23. A process according to claim 19 wherein said organic polysulfide polymer has a formula of $GS_m$–$(R'S_n)_q$–$R'S_mG$ wherein R' is a hydrocarbyl radical having 1 to about 20 carbon atoms; G is selected from hydrogen, $C_1$–$C_{20}$ hydrocarbyl radicals, and combinations of any two or more thereof; m is 1 if G is hydrogen; m is a number of 2 to about 10 if G is a $C_1$–$C_{20}$ hydrocarbyl radical; n is a number between 2 to about 10, and q is a number of 1 to about 1,000.

24. A process according to claim 23 wherein R' is a hydrocarbyl radical having 2 to 15 carbon atoms and q is a number of about 5 to about 500.

25. A process according to claim 19 wherein said dimercaptan is dipentene dimercaptan.

26. A process according to claim 19 wherein said basic catalyst is selected from the group consisting of methylamine, ethylamine, propylamine, isopropylamine, butylamine, isobutylamine, pentylamine, isoamylamine, dimethylamine, diethylamine, dipropylamine, dibutylamine, diisopropylamine, trimethylamine, triethylamine, tributylamine, ethylenediamine, sec-butylamine, tert-butylamine, methylethylamine, dimethyl-sec-butylamine, aniline, N-methylaniline, N,N-dimethylaniline, γ-aminobutyric acid, 2-aminoethanol, 2,4, 6-tribromoaniline, N-methyl-N-ethylamine, p-nitroso-N,N-dimethylamine, p-toluidine, cyclohexylamine, benzylamine, hexamethylenediamine, benzidine, tetramethylammonium hydroxide, tetraethylammonium hydroxide, tetrapropylammonium hydroxide, tetramethylammonium bisulfide, tetraethylammonium bisulfide, lithium hydroxide, sodium hydroxide, potassium hydroxide, calcium hydroxide, magnesium hydroxide, sodium bicarbonate, sodium carbonate, sodium oxide, magnesium oxide, calcium oxide, calcium carbonate, potassium carbonate, sodium phenoxide, sodium bisulfide, sodium sulfide, barium phenoxide, calcium phenoxide, RONa, RSNa, and combinations of any two or more thereof wherein R is a $C_1$–$C_{18}$ alkyl radical.

27. A process according to claim 20 wherein said basic catalyst is sodium hydroxide.

28. A process according to claim 19 wherein said basic catalyst is triethylamine.

29. A process according to claim 19 wherein said organic polysulfide polymer is polyethylene polysulfide having the formula of $GS_m$–$(CH_2$–$CH_2$–$S_n)_q$–$CH_2CH_2S_mG$ wherein G is selected from hydrogen, $C_1$–$C_{20}$ hydrocarbyl radicals, and combinations of any two or more thereof; m is 1 if G is hydrogen; m is a number of from 2 to about 10 if G is a $C_1$–$C_{20}$ hydrocarbyl radical; n is a number of from 2 to about 10; and q is a number from 10 to 200.

30. A process according to claim 19 wherein said dimercaptan is selected from the group consisting of 1,2-ethanedithiol, 1,2-propanedithiol, 1,3-propanedithiol, 1,10-decanedithiol, dipentene dimercaptan, ethylcyclohexyl dimercaptan, 1,4-benzenedithiol, 1,2-benzenedithiol, 1,3-benzenedithiol, and combinations of any two or more thereof.

31. A process according to claim 19 wherein said process is carried out in the presence of a solvent.

32. A process according to claim 31 wherein said solvent is selected from the group consisting of water, alcohols, hydrocarbons, ethers, and combinations of any two or more thereof.

33. A process according to claim 31 wherein said solvent is methanol.

34. A process according to claim 19 wherein the molar ratio of dimercaptan to sulfur is in the range of from about 0.01:1 to about 2:1.

35. A process according to claim 19 wherein the molar ratio of dimercaptan to sulfur is in the range of from 0.2:1 to 0.8:1.

36. A process according to claim 19 wherein unreacted dimercaptan is separated from said organic polysulfide polymer for reuse as reactant.

37. A process according to claim 19 wherein said dimercaptan is dipentene dimercaptan; said mercaptan is n-octyl mercaptan; said basic catalyst is triethylamine; the molar ratio of dimercaptan to sulfur is in the range of from about 0.01:1 to about 2:1: and said process is carried out at a temperature in the range of from about 25° C. to about 200° C. for about 2 minutes to about 6 hours.

38. A process for producing dipentene dimercaptan polymer having an average of about 2.5 sulfur per repeating unit comprising contacting n-octyl mercaptan with a mixture, which comprises dipentene dimercaptan, elemental sulfur, and triethylamine, at a temperature in the range of from 50° C. to 150° C. for 1 minute to 5 hours.

39. A composition produced by the process according to claim 19.

* * * * *